Feb. 9, 1943.  R. E. HART  2,310,430
CARRIAGE CONTROL MECHANISM
Filed May 2, 1941  4 Sheets-Sheet 1

INVENTOR.
Robert E. Hart
BY
ATTORNEY.

Feb. 9, 1943.   R. E. HART   2,310,430
CARRIAGE CONTROL MECHANISM
Filed May 2, 1941   4 Sheets-Sheet 3

INVENTOR
Robert E. Hart
BY
ATTORNEY

Feb. 9, 1943.　　　　　R. E. HART　　　　　2,310,430
CARRIAGE CONTROL MECHANISM
Filed May 2, 1941　　　　4 Sheets-Sheet 4

INVENTOR.
Robert E. Hart
BY
ATTORNEY.

Patented Feb. 9, 1943

2,310,430

UNITED STATES PATENT OFFICE 2,310,430

CARRIAGE CONTROL MECHANISM

Robert E. Hart, Poughkeepsie, N. Y., assignor to International Business Machines Corporation, New York, N. Y., a corporation of New York Application May 2, 1941, Serial No. 391,494

29 Claims. (Cl. 197—67)

This invention relates to carriage control mechanisms and, more particularly, to pneumatic drive mechanisms for carriages of typewriting and punching machines and the like.

The general object of the instant invention resides in the provision of pneumatic drive means of improved construction and arrangement for operating the carriage during normal spacing operations and also to provide automatic control during certain functional movements such as tabular spacing, eject and carriage return.

More specifically, the object of the invention is to provide a carriage mounted on a movable hollow cylinder which is displaced back and forth along a stationary piston by means of regulated air or other fluid pressure.

Another specific object is the provision of a needle valve in the air system and control means therefor for controlling the air pressure automatically during certain functions such as tabular spacing, carriage return and ejecting operations to govern the speed of movement of the carriage during these operations.

An additional object is to provide a pump of high efficiency and simple construction to maintain the air pressure in the system at the proper value for smooth operation of the carriage in either direction. This phase of the invention is claimed in my copending application Serial No. 429,497, filed February 4, 1942.

A further object of the invention is the provision of means controlled by the carriage, as it is spaced to its last column position, for automatically causing a reversal, in the direction of the air pressure supplied by the pump, to effect a carriage return.

According to the invention, the carriage is mounted on a hollow cylinder which is slidable along a piston under air pressure supplied and maintained by a rotary pump. An escapement mechanism normally holds the carriage in one of a plurality of columnar positions, and this mechanism is operated, upon the depression of a character key, to control the normal spacing movement of the carriage from one column to the next. Carriage return is effected under control of the carriage itself in that the direction of the air pressure from the pump is automatically reversed as the carriage reaches its last columnar position. In order that the carriage will not move too rapidly, on the longer tabular spacing, carriage return and ejecting operations, a needle valve is inserted in the air system to reduce the effective pressure of the air and thus cushion the movement of the carriage.

Other objects of the invention will be pointed out in the following description and claims and illustrated in the accompanying drawings, which disclose, by way of example, the principle of the invention and the best mode, which has been contemplated, of applying that principle.

Referring now to the drawings, there is shown a portion of the operating mechanism of a machine commonly referred to in the art as a "printing punch" because of the fact that provision is made for the punching of holes in a record card accompanied by the interpretation of said holes in printed form at the top of the card. One embodiment of such a machine is disclosed and described in detail in United States Patent 2,046,082, issued to A. W. Mills on June 30, 1936. The instant invention will be described presently, by way of example, in connection with a machine of this type, and only such parts of the old structure which are deemed necessary to clarify the description of the invention will be considered herein. More detailed information as to the various general operations of the machine, if desired, may be obtained by referring to the above mentioned patent.

Figure 9:
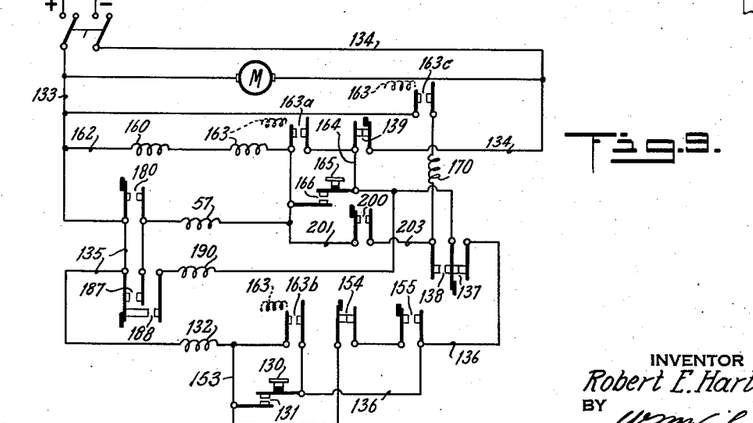
Fig. 9 is a wiring diagram showing the essential circuits for controlling the carriage movements under various conditions.

Briefly, the drive mechanism (Fig. 4) comprises a power driven shaft 20 which is journaled in bearing supports 21 and 22 and is rotated by suitable power means continuously in the direction indicated by the arrow. Shaft 20 carries a worm 23 meshing with a gear 24 fastened on a transverse shaft 25 which will hereafter be referred to as the "clutch" shaft. A spiral gear 26 is secured to shaft 20 and is arranged to mesh with a gear 27 for the purpose of rotating the vertical shaft 28 and roller 29 fastened to the upper end of shaft 28. Just to the left of the bearing support 22, the shaft 20 is enlarged and carries a worm 30 which meshes with gear 31 fastened to a transverse shaft 32. Thus, it is seen that shafts 20, 25, 28, and 32 are maintained in continuous rotation as long as the power means is operative. A suitable power means is represented by an electric motor M in the wiring diagram (Fig. 9) where it is shown to be connected directly across the line for continuous operation. The extreme left end of the power driven shaft 20 connects directly with the rotor of an air pump, generally designated 35, which will now be described.

The pump 35 (Figs. 5–8) is of the rotary type comprising a rotor 36 with four equally spaced blades 37 freely mounted in radial slots 38 and biased outwardly by springs 39. Enclosing the rotor 36 is a hardened ground ring 40 with which the edges of blades 37 engage. Since the pump is maintained in continuous operation through its connection with shaft 20, it is necessary to reduce friction to a minimum to prevent overheating. To accomplish this, the ring 40 is mounted freely on roller bearings 41 so that it may rotate with the blades. A finned casing 42 surrounds the parts just described and holds bearings 41 in contact with the outer surface of ring 40. A back plate 43 is provided and is fitted to the back of the casing 42. A spacer plate 44 is inserted between the back plate and the casing. Mounted freely within the front end of the casing is a bearing retainer 45, and immediately in front of the bearing retainer and fitted to the front end of the casing is a front end plate 46.

Plate 46 is a casting of appreciable thickness and is provided with an intake port 48 and a pressure port 47 extending in an axial direction through the plate and a pair of outlet ports 49 and 50 extending in a radial direction through the shell of the casting. A rotatable valve 51 is freely mounted within the casting and is provided with a pair of elongated holes 52 and 53 which are each arranged to cooperate with one or the other of the ports 47 and 48 to complete air passageways between the latter ports and the outlets 49 and 50. In the position shown, port 47, valve hole 52, and outlet 49 form an air path as do port 48, valve hole 53, and outlet 50. In view of the counterclockwise rotation of the rotor 36, the outlet 49, as shown, is delivering air to the exterior whereas outlet 50 is serving to admit air to the pump. Under normal conditions, however, as explained later, it is desirable to have the direction of air flow through these outlets reversed, such reversal being accomplished by a limited rotation of the valve 51.

Figure 6:
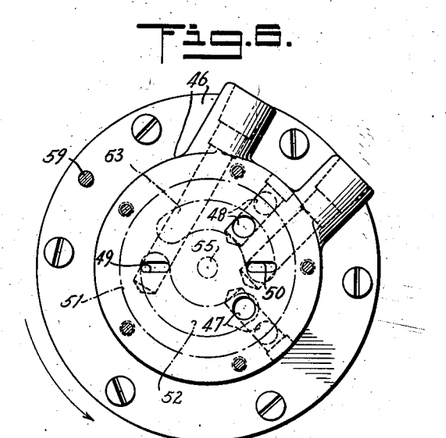
Figure 7:
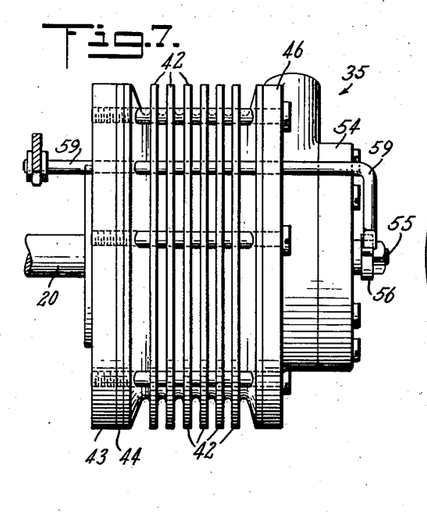
Figure 8:
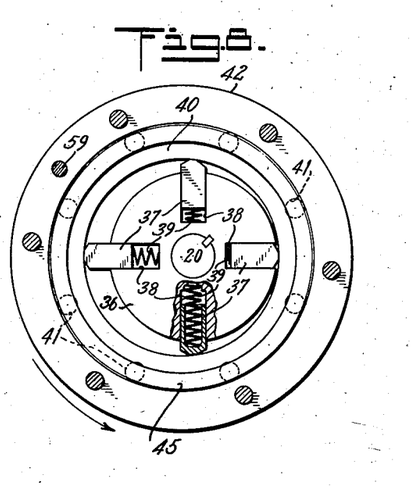

A cover plate 54 is placed in front of valve 51 and is screwed to the front end plate casting 46 so as to form an enclosure for the valve. An axial stud 55, fastened to valve 51, extends through the cover plate and has a short bifurcated arm 56 also secured thereto. Movement of arm 56 rocks the stud 55, thereby causing a limited rotation of valve 51. In order to effect movement of the arm 56 automatically, a solenoid 57 (Fig. 1) with a plunger 58 is provided. The solenoid is mounted conveniently on an adjacent portion of the frame of the machine. The plunger 58 is connected to a shaft 59 which extends through holes in the back and front end plates, and is bent at substantially a right angle at a point in front of the front cover plate, and is seated in the bifurcated arm 56. The seated end of shaft 59 is beveled to interfit more effectively with arm 56 but, of course, a sufficient clearance must be maintained to prevent binding. It will be evident that the attraction of plunger 58 upon energization of solenoid 57 causes a rocking of shaft 59 to move arm 56, and hence valve 51 to the position as shown in Fig. 6, to bring about a reversal in the normal direction of the air pressure delivered by the pump. Solenoid 57 will hereafter be referred to as the "pump" solenoid.

Figures 1, 1A:
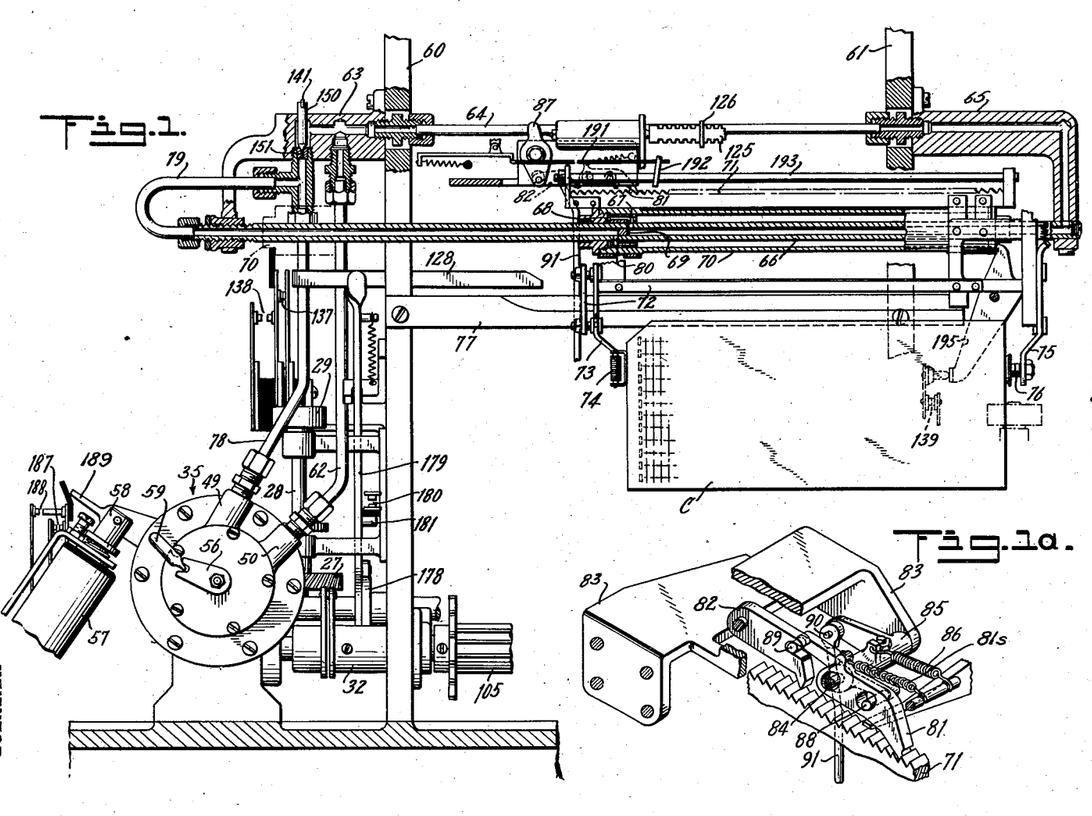
Fig. 1 is a front sectional view of the carriage and associated mechanism and the air system for operating the same.
Fig. 1a is a detail perspective view of the rack escapement assembly.

Referring now to Fig. 1, it will be noted that the outlets 49 and 50 are connected to a closed air system, the air lines for which are supported by side frames 60 and 61 and hollow castings 63 and 65, respectively, carried by the side frames. A hollow rod 66, supported at one end by an extension of casting 63 and at the other end by casting 65, carries an air cylinder 70 slidably mounted thereon. The air cylinder is part of a carriage assembly which includes a rack 71 (see also Fig. 1a) and a frame 72. Pivotally mounted at the left and right ends of frame 72, respectively, are record card fingers 73 and 75 which are adapted to hold a record card C of predetermined size. The left card finger 73 is spring-biased toward the right card finger 75 by a coil spring 74, and the right card finger 75 is provided with an adjustable screw 76 which is set to obtain accurate alignment of the card with respect to the carriage rack 71. The record card is divided into vertical columnar positions and the distance from column to column on the card corresponds to the distance between teeth on the rack. A guide rail 77 is provided for the carriage frame 72 and is supported by the side frames 60, 61. Thus, any movement of the air cylinder 70 along rod 66 is accompanied by corresponding movement of the entire carriage assembly and the record card carried thereby.

With the carriage and air cylinder at the extreme right, as shown, or in other words, in the first column position, the pump valve 51 is positioned in the normal position and the pump forces air through outlet 50, air line 62, hollow portion of casting 63, air line 64, hollow portion of casting 65, hollow rod 66, a port 67 in rod 66, against a cylinder head 68 of cylinder 70, thus exerting pressure tending to move the carriage assembly toward the left. The hollow rod 66, which is closed near the center by a closure plug 69, may be considered the piston for cylinder 70, and it will be noted that, whereas the usual piston and cylinder arrangement provides for movement of a piston within a stationary cylinder, here the piston becomes the stationary element. It will be appreciated that while air is being forced from the pump along line 62 to exert pressure on the cylinder head 68, air in line 78 at the same time is being exhausted to create a partial vacuum in line 79 which operates through the left half of piston rod 66 and its piston port 80 to provide, in effect, an additional force tending to move the air cylinder 70 to the left.

Normally overcoming the leftward bias of the cylinder 70 is an escapement assembly best shown in Fig. 1a. This assembly comprises a loosely pivoted, spring-biased dog 81 normally resting in a tooth in the rack 71, and an escapement pawl 82 normally clear of the rack. A supporting bracket 83 carries a short shaft 84 on which is pivoted a rocker arm 85 and the dog 81. Arm 85 is biased in a clockwise direction about shaft 84 by a spring 86 fastened to the supporting bracket 83. The escapement pawl 82 is pivotally carried by an adjustable plate 87 (Fig. 1) fastened to the front of bracket 83. The rocker arm 85 is provided with a pin 88 which extends through a hole in the dog and another pin 89 which cooperates with a slot in the free end of the escapement pawl. A third pin 90 carried by the rocker arm is connected to an eye in a vertical rod 91. The arrangement is such that downward movement of rod 91 rotates the rocker arm 85 counterclockwise, causing pin 88 to raise the dog clear of the rack and pin 89 to lower the escapement pawl into a tooth in the rack. The rack is advanced a barely perceptible amount as the escapement pawl seats in a tooth, and the dog is given a slight forward movement as the dog spring 81s takes up the slack at the pivot point of the dog. Upon restoration of rod 91, the parts just described are returned to normal, except that the dog, by reason of its slight linear displacement relative to the rack, seats itself in the next tooth in the rack and in doing so permits the carriage to advance one column.

Figures 2, 3A:
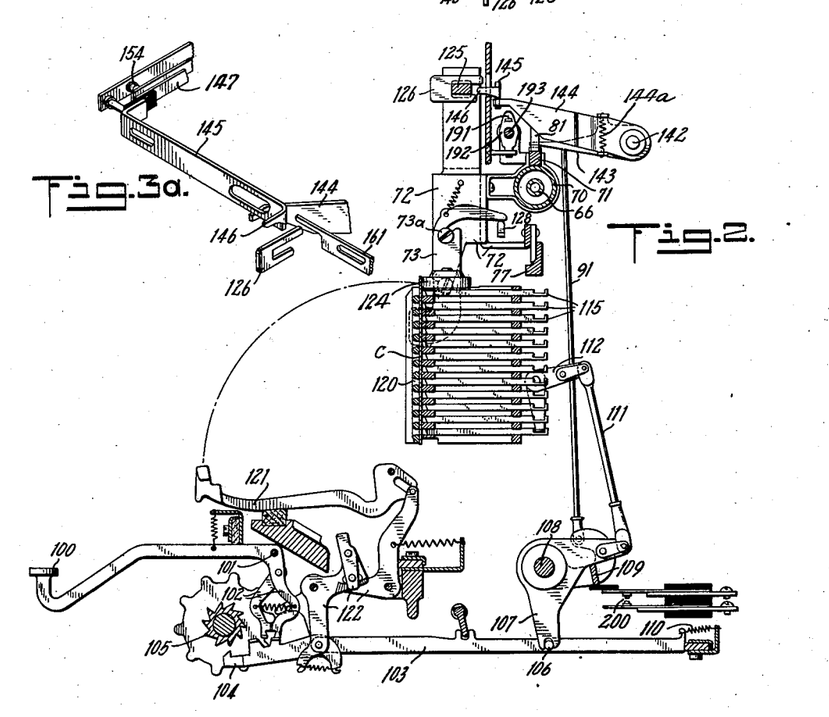
Fig. 2 is a side sectional view of a portion of the operating mechanism of the machine to which the invention is applied.
Fig. 3a is a detail perspective of part of the mechanism shown in Fig. 3.

The necessary movement of rod 91 to effect operation of the escapement mechanism described above is produced in the following manner. Depression of a character key lever 100 (Fig. 2) about its pivot 101 causes the opening of a scissors arrangement 102. A single key lever is shown as representative, it being understood that there is a different key for each character. The opening of scissors 102 permits a spring biased bar 103 to move upwardly. The left end of bar 103 is formed into a hook portion 104 which engages with one of the blades of a reamer-shaped power actuator 105. The power actuator is in continuous clockwise rotation, as viewed in Fig. 2, being secured to shaft 32. Thus, upon engagement of hook 104 with one of the blades of power actuator 105, the bar 103 is moved quickly to the left. Bar 103 carries a pin 106 which engages the lower part of a bell-crank arm 107 which in turn is pivoted on a shaft 108 carried by the side frames of the machine. Thus, the leftward movement of bar 103 causes clockwise movement of bell-crank 107. Also pivoted on shaft 108 is a bail 109 which is set in clockwise rotation by the bell-crank arm 107. The bail 109 is connected with the escapement operating rod 91 and hence pulls the rod downward. The bar 103 is released from the power actuator 105 very shortly after its engagement; and the restoring spring 110 restores the bar and bell-crank 107 to normal, thus allowing bail 109 and rod 91 to be restored by spring 86 (Fig. 1a) to complete the operation of the escapement mechanism so as to advance the carriage one column, as described hereinbefore.

Attached to the bell-crank 107 is a connecting link 111 which connects with a smaller pivoted bell-crank member 112 to rotate the latter member a limited amount, clockwise, upon operation of bell-crank 107. The lower part of bell-crank 112 is bent over to fit in a slot in one of the punches 115, the arrangement being such that upon operation of the bell-crank the punch is moved through the record card and a limited distance into a die member 120. It should be mentioned at this point that, as the punch is being driven through the record card, the escapement pawl 82 is holding the rack 71, and hence the card, against movement, and the spacing of the rack is timed to immediately follow the withdrawal of the punch from the card during the return of bell-crank 107 to its normal position. Meanwhile, prior to the spacing of the carriage, a type bar 121 carrying type, denoting the character represented by the key depressed, is set in motion by suitable linkage, generally designated 122, which connects with, and receives its motion from, bar 103 when the latter bar is moved to the left. The movement of bar 103 is sudden and rapid so as to impart considerable momentum to the type bar to carry it up against the card with sufficient force to make an imprint. The card is backed by a suitable platen 124 (Fig. 2) at the printing line which is immediately above the uppermost punch. The printing and punching operations in themselves are conventional in machines of this type and consequently form no part of the present invention.

The operations of the machine thus far described have pertained to the normal spacing movement of the carriage, by the escapement mechanism, which accompanies printing and punching. Now assume that it is desired to skip the carriage from the column it happens to be in to a predetermined column to the left. This operation is commonly referred to as "tabulating." An auxiliary rack 125 with columnar indications thereon is provided to facilitate this operation and is known as the "tab" rack. The "tab" rack is connected to the rest of the carriage assembly and moves therewith. A clip 126 is attached to rack 125 at a columnar position, one to the right of the position in which the rack is to stop at the end of a tabulating operation, which operation will now be described.

Figure 3:
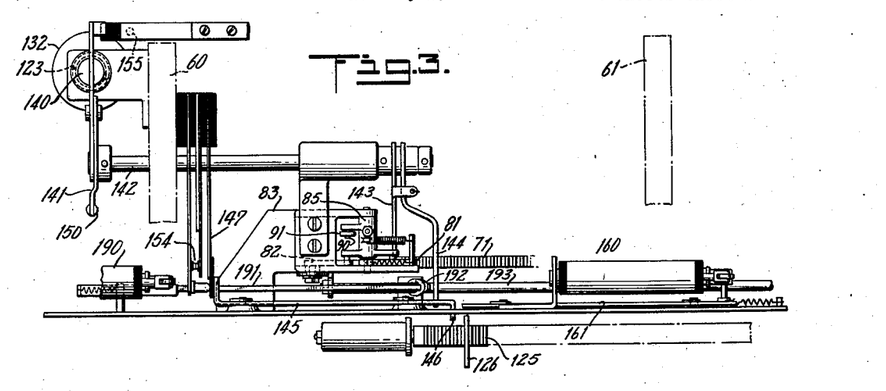
Fig. 3 is a top view of a portion of the carriage control mechanism.

A "tab" key 130 (Fig. 9), which may be located in any convenient place on the machine, controls the initiation of a tabulating operation. Depression of key 130 closes contacts 131 to energize a solenoid 132 by an obvious circuit from positive line 133, wire 135, solenoid 132, contacts 131, now closed, wire 136, contacts 137, contacts 139 to negative line 134. Solenoid 132, as may be seen from Fig. 3, is provided with a plunger 140 which connects with a lever 141 pivotally secured to shaft 142. The latter shaft carries a pair of arms 143 and 144, one of which, namely, 143 is connected to shaft 142 for rotation thereby and extends under the dog 81 and the other of which, namely, 144 is loosely mounted on 142 and extends under an arm 145 slidably carried by a portion of the frame of the machine. The arm 145 has a part 146 on it which extends outwardly toward the "tab" rack but is normally beneath the rack sufficiently to permit clearance for a clip such as 126. Energization of solenoid 132, however, has the effect of rocking shaft 142 to raise arm 143 and permits a spring 144a (Fig. 2) to raise arm 144. This lifts the dog 81 to release the rack and also lifts the arm 145 so that bent-over portion 146 on the end of the arm will be in position to engage the clip 126 on the "tab" rack when the carriage has moved the desired distance. The arm 145 has considerable play in its slidable mounting, so that it may be moved up and down an appreciable extent as well as laterally (see Fig. 3a).

In order that the carriage will not gain too much speed where a considerable number of columns are to be skipped, the tabulating solenoid 132 is also arranged to control a bleeder valve stem 150 which is connected to one end of lever 141 (see also Fig. 1), so that the attraction of plunger 140 by the solenoid causes raising of the valve stem 150 to open the valve passageway 151 (Fig. 1). Referring for the moment to Fig. 1, it will be noted that with the valve open, a portion of the air in hollow casting 63 may pass into the pipes 78 and 79, thus tending to neutralize the partial vacuum in cylinder 70 and to reduce the resultant force effective on the cylinder. This effect is analogous to that of a governor on a spring-driven rack and, because of this feature, the carriage never attains an undesirably fast speed.

Maintenance of the tabulating solenoid 132 in its energized position during the entire tabulating operation is essential, because dog 81 must be kept out of the rack 71. Therefore, a pair of holding contacts 155 (Figs. 3 and 9) are provided, these contacts being secured to side frame 60 in such a location as to be operated by the downward movement of lever 141 as the solenoid becomes energized. Contacts 155 close a holding circuit from positive line 133, wire 135, solenoid 132, wire 153, contacts 154, contacts 155 now closed, wire 136, contacts 137 and 139 to negative line 134.

The tabulating operation terminates as the clip 126 on the "tab" rack strikes against the bent-over end 146 of the slidable arm 145, moving the arm to the left. Contacts 154, known as the tabulating solenoid "break" contacts, are mounted so as to be opened by the leftward movement of arm 145 to open the holding circuit for solenoid 132 described above. A return spring 123 on the plunger 140 brings about the lowering of arms 143 and 144 as the solenoid is deenergized. Arm 145 then drops down below the clip 126, releasing the rack for movement, and the dog 81 seats itself into a tooth in the rack permitting the rack to move but one additional space. A spring 147 (Fig. 3a) engaging the arm 145 returns the arm to its normal rightward position permitting contacts 154 to again close. Meanwhile, contacts 155 have opened so that no circuit is completed to energize solenoid 132 unless contacts 131 are again closed by the "tab" key 130. As the solenoid plunger 140 is restored to normal by spring 123, lever 141 lowers valve stem 150 to place the valve once again in the normally closed position.

At certain times it is desirable to release the carriage immediately from whatever position it may be in and permit it to skip to the last column position. This operation is commonly referred to as "ejecting," because after the carriage reaches the last column position the record card is ejected, as will be explained later. The actual movement of the carriage to the last column position is quite similar to that for the tabular skip operation described above. The "tab" solenoid 132 is energized to cause the dog 81 to be lifted off the rack 71 and to concurrently cause lever 141 to open the bleeder valve passageway 151. There is one marked difference, however, between tabulating and ejecting, and that is in the provision of means effective during ejecting operations to prevent arm 145 from being raised to interfere with the tabular control clip 126. The means referred to comprise a solenoid 160 (Figs. 3 and 9) with an interposer 161 connected to the armature thereof. The solenoid is mounted on the frame of the machine to the right of arm 145. Energization of solenoid 160 causes interposer 161 (Fig. 3a) to extend over arm 145, thus holding arm 145 down even though the spring-driven arm 144 rendered operative by the energized solenoid 132 continues to urge arm 145 upward. An ejecting operation is initiated by the depression of a conveniently located key 165 (Fig. 9), which closes contacts 166 to establish a circuit for the purpose of energizing both the interposer solenoid 160 and the tabulating solenoid 132 as follows: positive line 133, wire 162, solenoid 160, relay winding 163, contacts 166, now closed, wire 164, contacts 139, to negative line 134. It will be noted that relay winding 163 is also energized by the circuit just traced. This relay has three sets of contacts designated 163a, 163b, and 163c, respectively, which are changed from the position shown when the relay winding is energized. Thus, contacts 163a are now closed to provide a shunt circuit around contacts 166 to keep solenoid 160 and winding 163 energized. Contacts 163b are now closed to energize the tabulating solenoid 132, and contacts 163c are also now closed, for a purpose to be described presently.

Figure 4:
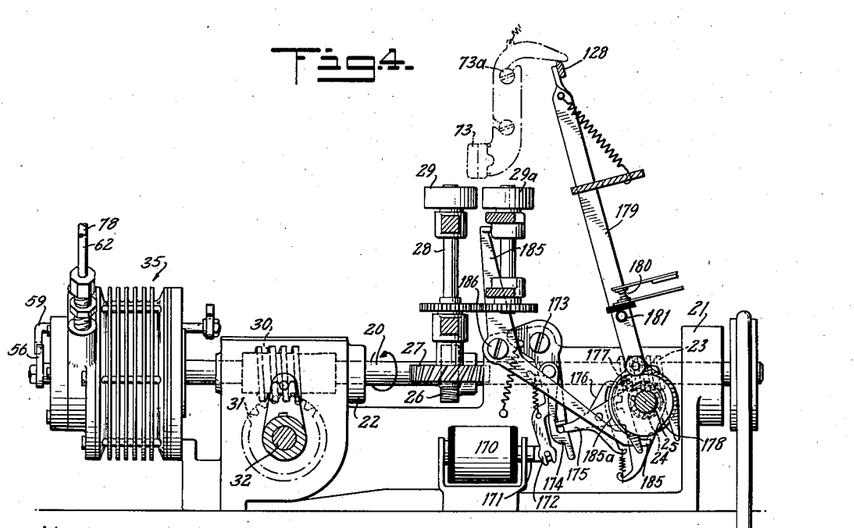
Fig. 4 is a sectional view showing the essential parts of the drive mechanism of the machine.
Figure 5:
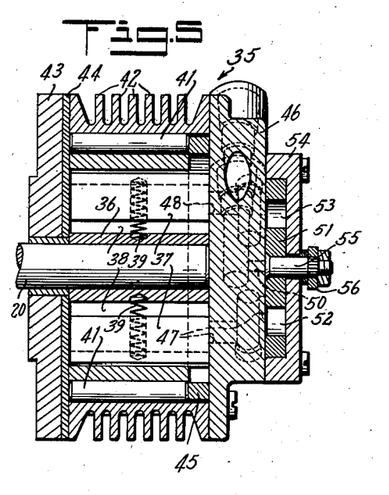
Figs. 5, 6, 7 and 8 are detail structural views of the pump structure.

A transfer contact assembly comprising contacts 137 and 138 (Figs. 1 and 9) is mounted on side frame 60 and is arranged to be operated by the leading edge of the air cylinder 70 as the carriage reaches the last column position. In the operated position, contacts 137 are opened and contacts 138 are closed. The tabulating solenoid 132 is deenergized by the opening of contacts 137, whereas a circuit is completed by the closure of contacts 138 through the already closed relay contacts 163c. This circuit energizes a clutch solenoid 170 which is mounted on the framework of the machine at a point just to the left of the clutch shaft 25, as shown in Fig. 4. The armature 171 of solenoid 170 is connected with the lower end of an arm 172 whose upper end is pivoted to the frame at 173. Arm 172 carries a spring-biased, pivoted latching arm 174 which normally engages a dog 175 carrying a pawl 176. The pawl is aligned with a ratchet 177 fastened to the clutch shaft 25. With this construction, energization of the clutch solenoid 170 causes the dog 175 to be released from latch-arm 174 so that pawl 176 engages ratchet 177. The dog 175 is connected with a pair of cams 178 and 185a secured to shaft 25 and, consequently, engagement of the pawl with the ratchet cause the dog and the cams to rotate with the ratchet. A cam follower arm 179 is moved upwardly as the cam 178 rotates. A pair of contacts 180 mounted on the frame are closed by a pin 181 on the follower arm. The upper end of arm 179 raises a bar 128 and thus causes the card finger 73 to be rocked counterclockwise about its pivot 73a so as to remove the finger from the edge of the record card which has now entered the space between continuously running roller 29 and the idler roller 29a. As the second cam 185a rotates, a second cam follower 185, pivoted on a stud 186, is rocked counterclockwise a limited amount to permit the spring-pressed roller 29a to move into engagement with the edge of the card, thereby squeezing the card between the rollers and causing its rapid ejection from the card carriage.

The next step in the cycle of operations is to effect a carriage return. In order to accomplish this, it is first necessary to energize the pump solenoid 57 so as to shift the valve 51, thereby reversing the direction of the effective air pressure on the air cylinder 70. Upon closure of contacts 180, as described above, a circuit is completed (Fig. 9) as follows: positive line 133, contacts 180 now closed, pump solenoid 57, contacts 163a also now closed, contacts 139 to negative line 134. Energization of the pump solenoid by the circuit just traced causes closure of contacts 187 and 188 by a pin 189 connected to solenoid plunger 58. Contacts 187 serve to maintain solenoid 57 energized by shunting around contacts 180, and contacts 188 complete a circuit through a solenoid 190 (Fig. 3) which is mounted near the left side frame approximately in line with the carriage rack 71. The plunger of solenoid 190 is provided with an arm 191 which connects with rebound locking member 192 slidably supported on a rod 193 secured to the carriage assembly. The purpose of solenoid 190 is to condition the rebound locking member 192 to permit the carriage return. The rebound locking member 192, as the name implies, locks the carriage against rightward movement caused by rebound. The locking action is effected by a tilting of member 192 to bind against the rod 193. Solenoid 190, when energized, prevents member 192 from assuming its locking position so as to permit the carriage to be returned freely to its rightward limit of travel. It will be noted, that as the carriage moves back out of its last column position, contacts 137, previously opened, as described above, now close and the tabulating solenoid 132 becomes energized to open the bleeder valve 151 and to raise the dog 81 to keep it from dragging on the rack.

As the carriage reaches its extreme rightward position, it passes slightly beyond its true first column position and in doing so engages the upper end of a lever 195, the lower end of which cooperates with contacts 139 to open these contacts and break all the existing circuits traced above. Thus, the pump valve 51 is restored to normal and the air pressure on cylinder 70 is reversed once more so as to tend to move the carriage to the left. Then, as the carriage settles back into its true first column position (dog 81 seating itself in the first column position of rack 71), contacts 139 return to their normally closed position, as shown.

As the carriage moves back out of its last column position contacts 138 are returned to normal open position soon enough to break the clutch solenoid circuit in time to allow the dog 175 to latch up at the end of one revolution, and the left card finger 73 and eject roller 29a to be returned to normal.

In the foregoing description of ejecting and carriage return operations, it was assumed that the eject key 165 had been depressed. However, in the event that the carriage has been spaced to the last column as a result of repeated punching operations, then the punching operation for the last column of the record card automatically initiates ejecting and carriage return operations through a special pair of contacts 200 which are closed each time the bail 109 is operated, but which are only effective in the last column after contacts 138 close, as described above. The circuit completed by contacts 200 is traceable from positive line 133, wire 162, solenoid 160, relay coil 163, wire 201, contacts 200 now closed, wire 203, contacts 138 also now closed for the last column position of the carriage, contacts 139, to negative line 134. The circuit just traced is in parallel with the circuit through eject contacts 166. Thus, ejection of the card and return of the carriage following a last column punching operation is carried out in a fashion similar to that described hereinbefore when the eject key 165 was depressed.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine of the class described, an air system including a piston and a cylinder in cooperating relation, the piston being provided with ports permitting the passage of air to the cylinder from the piston and vice versa, an air pump connected in said system for normally forcing air through said piston and into the cylinder to bias the cylinder in one direction with respect to the piston, carriage mechanism including a rack secured to the cylinder and movable therewith as a unit, escapement mechanism normally cooperating with the rack to hold the cylinder against movement in the biased direction, means for operating the escapement mechanism to control the movement of the cylinder in said direction, and means actuated by said cylinder as said cylinder reaches its limit of travel in the said direction for reversing the direction of air pressure from said pump so as to force the cylinder back in the opposite direction, thereby automatically effecting return of the carriage to a predetermined position.

2. In a machine of the class described, an air system including an air cylinder slidably mounted on a hollow piston provided with ports permitting the passage of air of the cylinder from the piston and vice versa, an air pump connected in said system for normally forcing air through said piston and into the cylinder to bias the cylinder in one direction with respect to the piston, carriage mechanism including a rack secured to the cylinder and movable therewith as a unit, escapement mechanism normally cooperating with the rack to hold the cylinder against movement in the biased direction, means for operating the escapement mechanism to control the movement of the cylinder in said direction, and means actuated by said cylinder after a predetermined amount of movement in the said direction for reversing the direction of air pressure from said pump so as to force the cylinder back in the opposite direction to effect return of the carriage to a predetermined position.

3. In a machine of the class described, an air system including an air cylinder slidably mounted on a hollow piston provided with ports permitting the passage of air to the cylinder from the piston and vice versa, an air pump connected in said system for normally forcing air through said piston and into the cylinder to bias the cylinder in one direction with respect to the piston, escapement mechanism operable to control limited movements of the cylinder in the biased direction, and means actuated by said cylinder after a predetermined amount of movement in the said direction for reversing the direction of air pressure from said pump so as to force the cylinder back in the opposite direction to a predetermined position.

4. In a machine of the class described, an air system including an air cylinder slidably mounted on a hollow piston provided with ports permitting the passage of air to the cylinder from the piston and vice versa, an air pump connected in said system for normally forcing air through said piston and into the cylinder to bias the cylinder away from a home position with respect to the piston, escapement mechanism operable to effect limited steps of movement of the cylinder in the biased direction, and means actuated by said cylinder after a predetermined amount of movement in the said direction for reversing the direction of air pressure from said pump so as to force the cylinder back to home position.

5. In a machine of the class described, an air system including a piston and a cylinder in cooperating relation, the piston being provided with ports permitting the passage of air to the cylinder from the piston and vice versa, an air pump connected in said system for normally forcing air through said piston and into the cylinder to bias the cylinder away from a home position with respect to the piston, escapement mechanism and means for operating the same to control the movement of the cylinder in the biased direction, means actuated by said cylinder after a predetermined amount of movement in the said direction for reversing the direction of air pressure from said pump so as to force the cylinder back to the home position, and means actuated by the cylinder in arriving at the home position for reestablishing the normal bias of air pressure on the cylinder.

6. In a machine of the class described, a hollow piston, a carriage assembly comprising a rack and an air cylinder secured together and mounted for slidable movement on said piston, an air pump having air line connections with each end of the piston for normally forcing air through said piston in one direction and into said cylinder to bias the cylinder in said direction, escapement mechanism normally cooperating with the rack to hold the carriage assembly against movement in the biased direction and operable to permit normal spacing of said carriage in the said direction, tabular skip means operable to render the escapement mechanism ineffective, to cause the rack to be skipped a predetermined distance greater than the normal spacing distance, and means controlled by the last-mentioned means for partially neutralizing the air pressure on the cylinder during the tabular skipping operation to govern the speed of the carriage.

7. In a machine of the class described, a hollow piston, a carriage assembly comprising a rack and an air cylinder secured together and mounted for slidable movement on said piston, an air pump having air line connections with each end of the piston for normally forcing air through said piston in one direction and into the cylinder to bias said cylinder in said direction, escapement mechanism normally cooperating with the rack to hold the carriage against movement in the biased direction and operable to permit normal spacing of said carriage in said direction, tabular skip means operable to render the escapement mechanism ineffective, to cause the rack to be skipped a predetermined distance greater than the normal spacing distance, means controlled by the last-mentioned means for partially neutralizing the air pressure on the cylinder during the tabular skipping operation to govern the speed of the carriage, and means controlled by the carriage to restore the normal air pressure bias on the cylinder at the end of the skipping operation.

8. In a machine of the class described, a hollow piston, a carriage assembly comprising a rack and an air cylinder secured together and mounted for slidable movement on said piston, an air pump having air line connections with each end of said piston for normally establishing unequal air pressures at the ends of the piston to bias the cylinder in a predetermined direction with respect to said piston, escapement mechanism normally cooperating with the rack to hold the carriage against movement in the biased direction and operable to permit normal spacing of said carriage in said direction, means for rendering the escapement mechanism ineffective and for causing the rack to be skipped a predetermined distance greater than the normal spacing distance, and means controlled by the last-mentioned means for partially equalizing the air pressures at the ends of the piston during the skipping operation to govern the speed of the carriage.

9. In a machine of the class described, a hollow piston, a carriage assembly comprising a rack and a hollow cylinder secured together and mounted for slidable movement on said piston, an air pump having connection with each end of said piston for normally establishing unequal air pressures at the ends of the piston to bias the cylinder in a predetermined direction with respect to said piston, escapement mechanism and means for operating the same to cause normal spacing of the carriage in said direction, tabular skipping means for superseding the escapement mechanism to cause the rack to be skipped a predetermined distance greater than the normal spacing distance, means controlled by the last-mentioned means for partially equalizing the air pressures at the ends of the piston during the tabular skipping operation to govern the speed of the carriage, and means controlled by the carriage to restore the normal degree of inequality of air pressure at the ends of the piston.

10. In combination, a cylindrical element and a piston element cooperating therewith, one movable with respect to the other, an air pump, air line connections between the pump and the elements in which the pump normally maintains unequal air pressures on opposite sides of the movable element so as to bias the latter element in one direction, escapement mechanism and means for operating the same to control the movement of the movable element in said direction, means actuated by said movable element after a predetermined amount of movement in the said direction for reversing the air line connections to cause movement of said element in the opposite direction to a predetermined position, and means actuated by the movable element at the latter position to change the air line connections so as to reestablish the normal bias on the movable element.

11. In combination, a cylindrical element and a piston element cooperating therewith, one movable with respect to the other, carriage mechanism including a rack secured to the movable element, an air pump, air line connections between the pump and the elements in which the pump normally maintains unequal air pressures on opposite sides of the movable element so as to tend to move the latter element in one direction, an escapement mechanism cooperating with the rack to control the displacement of the movable element in said direction, means actuated by said movable element after a predetermined amount of movement in the said direction for reversing the air line connections to cause movement of said element in the opposite direction to return the carriage mechanism to a predetermined position, and means at the latter position actuated by the movable element to change the air line connections to normal.

12. In combination, a cylindrical element and a piston element cooperating therewith, one movable with respect to the other, carriage mechanism including a rack secured to the movable element, an air pump, air line connections between the pump and the elements in which the pump normally maintains unequal air pressures on opposite sides of the movable element so as to bias the latter element with a resultant force in one direction, an escapement mechanism cooperating with the rack to control the normal displacement of the movable element in the biased direction, means actuated by said movable element after a predetermined amount of movement in the said direction for reversing the air line connections to establish unequal air pressures providing a resultant force on the movable element in the opposite direction to return the carriage mechanism to a predetermined position, means effective during the carriage return to partially neutralize the latter force by reducing the inequality of the air pressures to govern the speed of the carriage, and means actuated by the movable element at the predetermined position to change the air line connections to normal, thereby reestablishing the normal bias on the movable element.

13. In combination, a cylindrical element and a piston element cooperating therewith, one movable with respect to the other, carriage mechanism including a rack secured to the movable element, an air pump, air line connections between the pump and the elements in which the pump normally maintains unequal air pressures at the ends of the movable element so as to bias the latter element with a resultant force in one direction, an escapement mechanism cooperating with the rack to control the normal spacing of the movable element in the biased direction, eject means superseding the effect of the escapement mechanism to skip the movable element directly to the limit of its travel in the direction of the resultant force normally produced by the unequal air pressures, means controlled by the eject means during the skipping of the movable element for partially neutralizing the effect of the resultant force of the unequal air pressures to govern the speed of the movable element, and means actuated by said movable element upon reaching its limit of travel in said direction for reversing the direction of said resultant force to cause movement of said element in the opposite direction to return the carriage mechanism to a predetermined position.

14. In a machine of the class described, a piston element and a cylinder element, one movable with respect to the other, an air pump, air line connections between the pump and said elements to establish unequal air pressures on opposite sides of the movable element thereby biasing said element in one direction, a carriage including a rack secured to the movable element, escapement mechanism cooperating with the rack for normal spacing operations in the biased direction, skipping means for superseding the action of the escapement mechanism for greater than normal spacing, and a normally closed bleeder valve adapted to be opened by the skipping means during abnormal spacing operations and to partially neutralize the inequality of pressure on opposite sides of the movable element so as to govern the speed of the carriage.

15. In a machine of the class described, a piston element and a cylinder element, one movable with respect to the other, an air pump, a pair of air line connections between the pump and the elements, one connected at each end of said elements to establish unequal air pressures on opposite sides of the movable element and thereby bias the latter element in a predetermined direction, a carriage including a rack secured to the movable element, escapement mechanism cooperating with the rack for normal spacing operations in the biased direction, skipping means for superseding the action of the escapement mechanism for greater than normal spacing, a normally closed bleeder valve connected between the two air line connections and adapted to be opened by the skipping means during abnormal spacing operations to partially neutralize the inequality of pressure on opposite sides of the movable element so as to prevent excessive speed of the carriage which would otherwise occur on the longer skipping operations.

16. In a machine of the class described, a piston element and a cylinder element, one movable with respect to the other, an air pump, a pair of air line connections between the pump and the elements, one at each end of said elements to establish unequal air pressures on the movable element so as to produce a resultant force for biasing said element in a predetermined direction, a carriage including a rack secured to the movable element, escapement mechanism cooperating with the rack for normal spacing operations in the biased direction, skipping means for superseding action of the escapement mechanism for greater than normal spacing, a normally closed bleeder valve connected between the air lines and adapted to be opened by the skipping means during the abnormal spacing of the carriage to partially neutralize the inequality of pressure on opposite sides of the movable element so as to govern the speed of the carriage, and means controlled by the movable element for automatically closing the bleeder valve at the end of abnormal spacing operations to reestablish the normal resultant force for biasing the movable element in the predetermined direction in cooperation with the escapement mechanism.

17. In a machine of the class described, a piston element and a cylinder element, one movable with respect to the other, an air pump, air line connections between the pump and said elements to establish unequal air pressures on opposite sides of the movable element and thereby to bias said element in one direction, a carriage including a rack secured to the movable element, escapement mechanism cooperating with the rack for normal spacing operations in the biased direction, skipping means for superseding the action of the escapement mechanism for greater than normal spacing, a normally closed bleeder valve between said air line connections adapted to be opened by the skipping means during abnormal spacing of the carriage to partially neutralize the inequality of pressure on opposite sides of the movable element so as to govern the speed of the carriage, and means for effecting a reversal of said air line connections to effect a return of the carriage after it has spaced a predetermined amount and for opening the bleeder valve automatically to pass air between the reversed air line connections to neutralize the resultant force on the movable element during the carriage return.

18. In a machine of the class described, a cylinder element and a piston element cooperating therewith, one movable with respect to the other, a carriage secured to the movable element for movement therewith, an air pump, air line connections between the pump and the elements in which the pump normally maintains unequal pressures on opposite sides of the movable element so as to bias the latter element in one direction, an escapement mechanism normally operable to space the carriage in predetermined limited steps in the biased direction, means to render the escapement mechanism ineffective so as to cause the carriage to move freely in the said direction, pressure regulating means controlled by the last mentioned means to partially neutralize the inequality of pressure on opposite sides of the movable element to prevent excessive speed of the carriage during its free movement, and means controlled by the carriage as it reaches a predetermined point in its movement for reversing the air line connections to cause movement of the carriage in the reverse direction to a predetermined position and for actuating the pressure regulating means to govern the speed of the carriage during its return to said predetermined position.

19. In a machine of the class described, a cylinder element and a piston element cooperating therewith, one movable with respect to the other, a carriage secured to the movable element for movement therewith, an air pump, air line connections between the pump and the elements in which the pump normally maintains unequal pressures on opposite sides of the movable element so as to bias the latter element in one direction, an escapement mechanism and means for operating the same to space the carriage normally in predetermined limited steps in the biased direction, means to render the escapement mechanism ineffective so as to cause the carriage to move freely a greater than normal distance in the said direction, pressure regulating means controlled by the last-mentioned means during the free movement of the carriage to partially neutralize the inequality of pressure on opposite sides of the movable element to prevent excessive speed of the carriage, means controlled by the latter element at the end of its free movement to render the pressure regulating means ineffective, and means controlled by the carriage, as it reaches the limit of its travel in the biased direction, for reversing the air line connections to cause movement of the carriage in the reverse direction to a predetermined position and for again actuating the pressure regulating means to govern the speed of the carriage during its return to said predetermined position.

20. In a machine of the class described, a cylinder element and a piston element in cooperating relation, the cylinder element being slidably mounted on the piston element, a carriage secured to the cylinder for movement therewith as a unit, an air pump, air line connections between the pump and the elements in which the pump normally maintains unequal pressure on opposite sides of the head of the cylinder so as to bias the cylinder in one direction, an escapement mechanism and means normally operating the same to space the carriage in predetermined limited steps in the biased direction, means to render the escapement mechanism ineffective so as to cause the carriage to move freely a greater than normal step in the said direction, air pressure regulating means controlled by the last-mentioned means during the free movement of the carriage to partially neutralize the inequality of the pressure on opposite sides of the cylinder head to prevent excessive speed of said carriage, means controlled by the carriage after it has completed its free movement to render the pressure regulating means ineffective and reestablish the normal air pressure bias on the cylinder head, and means controlled by the carriage after it has been spaced a predetermined amount in the biased direction for reversing the air line connections to cause movement of the carriage in the reverse direction to a predetermined position and for again actuating the pressure regulating means to govern the speed of the carriage during its return to said predetermined position.

21. In a device of the character described, a movable carriage, fluid means for moving said carriage, means for controlling said fluid means to produce a chosen sustained movement of said carriage, means rendered effective upon operation of said controlling means to alter the effect of said fluid, and means controlled by said carriage and rendered effective upon completion of said chosen sustained movement to restore said fluid means to normal.

22. In a device of the character described, a movable carriage, fluid means for moving said carriage, escapement mechanism for controlling the movement of said carriage, and means including a single operative device for both rendering said escapement mechanism inoperative and altering the effect of said fluid means.

23. In a device of the character described, a carriage, fluid means for moving said carriage in one direction, escapement means controlling the movement of said carriage in said one direction, means for rendering said escapement means inoperative and altering the degree of effect of said fluid means, and means rendered operative upon a predetermined movement of said carriage in said direction to alter the directive effect of said fluid means to thereby reverse the movement of said carriage.

24. In a device of the character described, a movable carriage, fluid means for moving said carriage in one direction, means rendered effective upon a predetermined movement in said one direction to reverse the effect of said fluid means to thereby reverse the movement of said carriage, means effective during a sustained movement of said carriage in said one direction to alter the degree of effect of said fluid means, means rendered effective upon completion of said sustained movement to restore said fluid means to a normal degree of effectiveness, and means rendered effective upon completion of said carriage reversal to restore the effect of said fluid means to its normal direction of effort.

25. In a device of the character described, a movable carriage, fluid means for moving said carriage, means controlling the normal movement of said carriage under the influence of said fluid means, means including means rendering said controlling means ineffective for producing an eject functional movement of said carriage and automatically altering the effect of said fluid means, and means rendered effective upon completion of said eject function to automatically reverse the effect of said fluid means to thereby reverse the movement of said carriage.

26. In a device of the character described, a movable carriage, fluid means for moving said carriage, means cooperating with said fluid means to produce intermittent step by step movement of said carriage, means rendered effective upon movement of said carriage from the next to the last to the last intermittent position for automatically reversing the effect of said fluid means to thereby reverse the movement of said carriage, and means altering the effect of said fluid means during said reversal.

27. In a device of the character described, a movable carriage, fluid means for moving said carriage, means cooperating with said fluid means to produce normal intermittent movement of said carriage, means for producing a skip movement of said carriage and altering the degree of effect of said fluid means, means restoring the effect of said fluid means to normal upon completion of said skip movement, means for reversing the effect of said fluid means upon movement of said carriage to a predetermined position to thereby reverse the movement of said carriage, and means simultaneously altering the degree of effectiveness of said fluid means during said reversal.

28. In a device of the character described, a movable carriage, fluid means for moving said carriage, means controlling said carriage to cause normal intermittent movement thereof, means for disabling said carriage controlling means to cause sustained movement of said carriage, and means controlled by said disabling means to alter the effect of said fluid means.

29. In a device of the character described, a movable carriage, fluid means for moving said carriage, means controlling said carriage to produce normal intermittent movement thereof, means including carriage arresting means for producing a tabulating movement of said carriage and altering the effect of said fluid means, and means for producing an eject movement of said carriage comprising means suppressing operation of said carriage arresting means during said ejection to prevent arresting of said carriage short of its eject position.

ROBERT E. HART.